Aug. 27, 1929.  C. A. SAWTELLE  1,725,885

VEHICLE BRAKE

Original Filed March 10, 1924  2 Sheets-Sheet 1

Inventor
Charles A. Sawtelle

By Whittemore Hulbert Whittemore
    Belknap   Attorneys

Aug. 27, 1929.　　C. A. SAWTELLE　　1,725,885

VEHICLE BRAKE

Original Filed March 10, 1924　　2 Sheets-Sheet 2

Inventor
Charles A. Sawtelle

By Whittemore Hulbert Whittemore
Belknap　　Attorneys

Patented Aug. 27, 1929.

1,725,885

UNITED STATES PATENT OFFICE.

CHARLES A. SAWTELLE, OF DETROIT, MICHIGAN, ASSIGNOR TO PERFECTION ENGINEERING COMPANY, OF DETROIT, MICHIGAN, A CORPORATION OF MICHIGAN.

VEHICLE BRAKE.

Original application filed March 10, 1924, Serial No. 698,323. Divided and this application filed December 29, 1924. Serial No. 758,711.

This application is a division of my copending application, Serial No. 698,323 filed March 10, 1924.

This invention relates to vehicle brakes and relates particularly to brakes for the front wheels of motor vehicles.

The invention seeks to effect a substantial equalization of the braking pressure acting throughout the engaged friction faces of a brake, and further seeks to accomplish this result without grabbing, chattering or backlashing.

A feature of the invention is the employment of three shoes to interiorly engage a brake drum, two of said shoes lying symmetrically at opposite sides of the axis of the drum and being engaged by a common actuating device, and the third shoe being mounted upon and actuable by the first mentioned shoes.

Another feature of the invention is the provision of a bearing for the actuating shaft of a front wheel brake supported within the brake drum in a manner to avoid interference with steering movement of the wheel and adapted to undergo a limited play laterally of said shaft to provide for equalization of the braking force applied in opposite directions by said shaft.

In the drawings:—

Figure 4 is a section on line 4—4 of Figure 1 showing primarily the provision for effecting equalization of the braking pressures applied to the aforesaid symmetrically disposed shoes; and Figure 5 is a detail view similar to Figure 4 but showing a slight modification.

Figure 1:
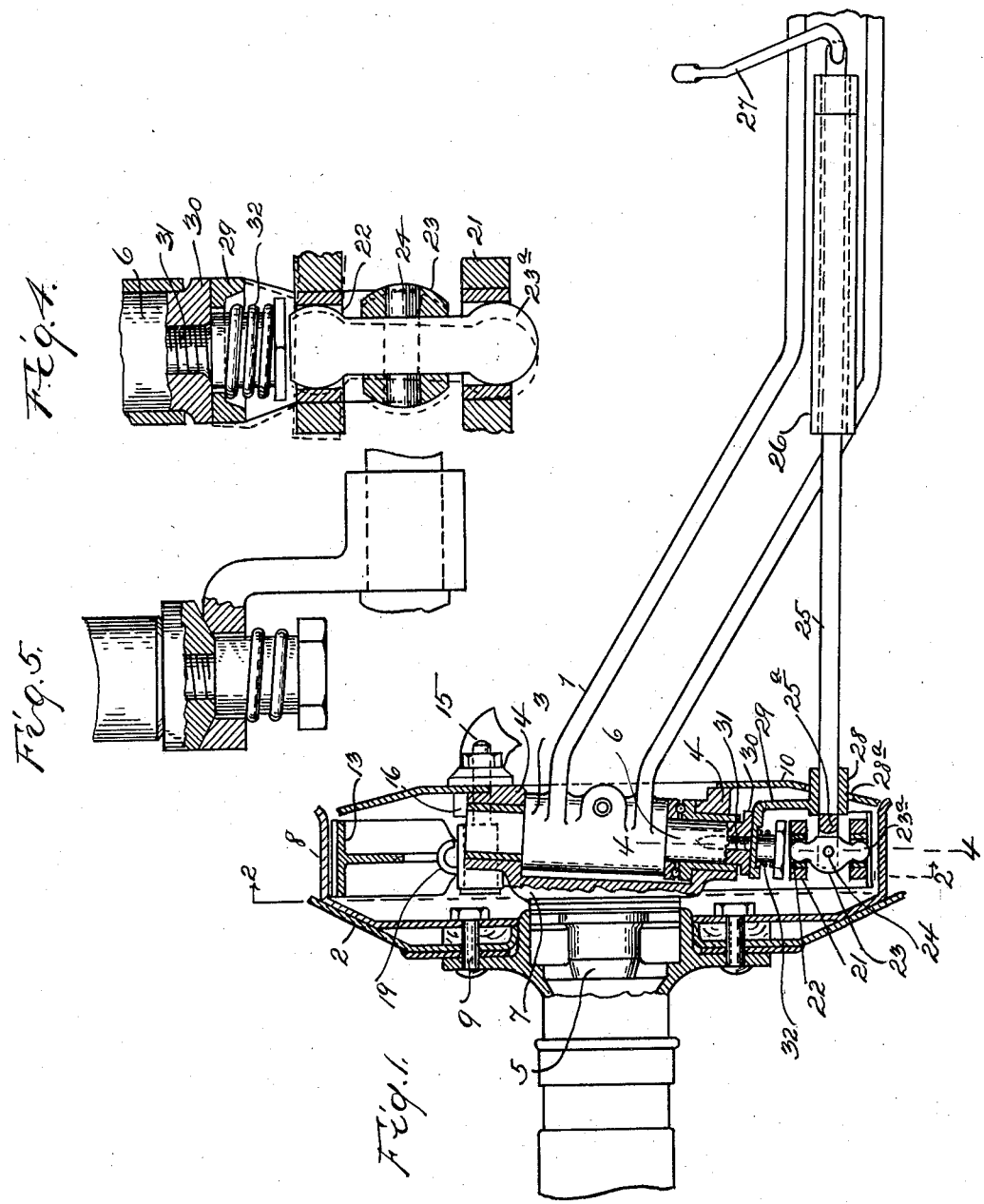
Figure 1 is an axial vertical sectional view of the improved mechanism showing a portion of the associated wheel and axle.
Figure 2:
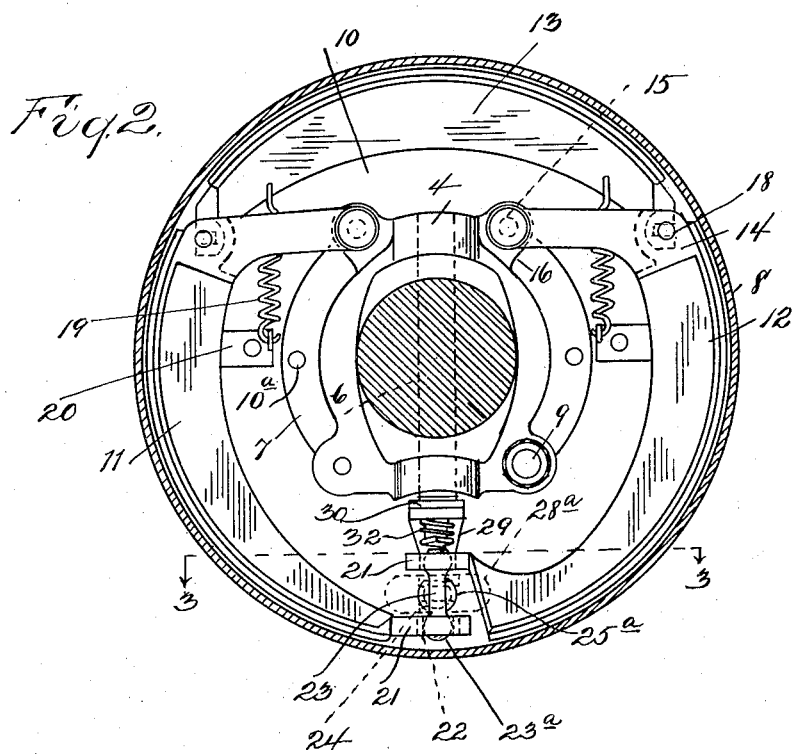
Figure 2 is a vertical section taken on line 2—2 of Figure 1.
Figure 3:
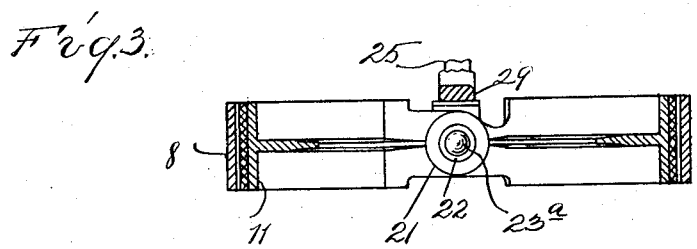
Figure 3 is a horizontal cross section on line 3—3 of Figure 2.

In these views the reference character 1 designates the front axle of a motor vehicle, and 2 is one of the ground wheels mounting said axle. Said wheel is adapted to swivel upon the axle 1 for steering purposes, following general practice by forming the axle terminally with a bearing 3 arranged between spaced upper and lower bearings 4 integral with a spindle 5 whereon said wheel is journaled, the bearings 3 and 4 being connected by a substantially vertical king pin 6. It is preferred to form as an integral unit the spindle 5, a circular head 7 from which said spindle centrally projects, and the bearings 4 which are carried by the upper and lower portions of the head 7. 8 is a brake drum rigidly secured to the wheel 2 by bolts 9 or other suitable fastenings. A sheet metal plate 10 rigidly secured to the head 7 by bolts 10ª serves as a closure for the brake drum. Said drum is internally engageable by three brake shoes 11, 12 and 13, the circumferential extent of said shoes being substantially equal, that is to say, each extending through an arc of approximately 120°. The brake shoes 11 and 12 are symmetrically arranged at opposite sides of the axis of the drum, their upper ends being formed integrally with arms 14 projecting toward each other and terminally engaging pivot bolts 15. Said bolts are mounted in lugs 16 oppositely integral with the upper bearing 4.

The third brake shoe 13 is arranged to engage the upper portion of the drum 8, its ends being pivoted as indicated at 18 respectively to the brake shoes 11 and 12 at the juncture of the arms 14 with said shoes. The three shoes 11, 12 and 13 are held normally properly spaced from the brake drum by a pair of coiled springs 19 which extend under tension vertically from the end portions of the shoe 13 to brackets 20 rigidly secured to the plate 10. Said springs urge the shoe 13 downwardly and act through said shoe upon the shoes 11 and 12 to urge the latter toward each other out of engagement with the brake drum.

The lower ends of the shoes 11 and 12 are formed with integral vertically spaced lugs 21 which are centered substantially in the extended axis of the king pin 6, and which are formed with central openings 22. In said openings are engaged the spherical extremities 23ª of an arm 23 which is pivoted near its center as indicated at 24 within a bifurcated head 25ª formed terminally on a brake applying rock shaft 25. Said shaft engages a bearing 26 upon the axle or is otherwise suitably mounted upon the latter, and an actuating arm 27 is carried by the inner end of said shaft. The usual drawrod (not shown) may be engaged with the arm 27 to rock the shaft 25.

28 is a bearing which supports the outer end portion of the shaft 25, said bearing preferably being arranged within a slot 28ª in the plate 10, sufficiently elongated horizontally to prevent interference by said bearing with the swivel movement which said plate undergoes in unison with the wheel 2 for steering purposes. The bearing 28 is carried by an integral arm 29 upwardly projecting within the drum 8 and having its upper portion bent through substantially a right angle to bear against a head 30 formed integrally upon the lower end of the king pin 6. 31 is a cap bolt passing through a central opening in said bent upper portion of the arm 29 and axially screw threaded in the king pin 6, and 32 is a spring coiled between the head of said bolt and the bent upper portion of said arm 29 holding the latter normally firmly pressed against the head 30.

Considering now the operation of the described construction, when the wheel 2 is swivelled for steering purposes under non-braking conditions, the lugs 21 simply turn about the spherical heads 23ª of the arm 23 so that the latter offers no interference with such swivel movement and no tendency arises from said movement to apply the brakes. Since the king pin 6 does not participate in the swivel steering movement of the wheel and since the bearing 28 and its supporting arm 29 are mounted upon said king pin no stress is placed upon said arm and bearing through such steering movement. If the shaft 25 is rocked either during straight-ahead travel of the wheel 2 or during steering swivel movement thereof, the arm 23 rocking with said shaft acts through its spherical ends 23ª upon the lugs 21 to urge the brake shoes 11 and 12 oppositely into engagement with the brake drum 8. Pivoting of the arm 23 upon the shaft 25 is necessary to permit the slight movement in opposite directions from the extended axis of the pin 6 and also in a direction parallel to the axis of the shaft 25 which the spherical heads 23ª must undergo when an application of the brakes is made during a swivel or steering movement of the wheel 2. This rocking movement of the arm 23 on the pivot 24 reduces the effective length of the said arm (measured transversely to the axis of the shaft 25), and consequently there is a decreased braking pressure responsive to rocking of the shaft 25 when the wheel 2 is undergoing swivel steering movement. It is to be noted that the pivot 24 is slightly closer to the upper than to the lower end of the arm 23. The distances from said pivot to the points of engagement of the heads 23ª with the two shoes are proportioned to compensate for the difference in the distances of the bearing points upon the shoes from the pivots 15 of said shoes.

If either of the shoes 11 or 12 engage the drum in advance of the other for any reason, as for example inaccurate assembly or unequal wear of the linings of said shoes, the disclosed mechanism would nevertheless equalize the braking pressures of said shoes against the drum, since under such conditions the shoe first engaged with the drum would fulcrum the arm 23 and the end 25ª of the shaft 25 would deflect laterally toward the other shoe so that the pressures applied through said arm to the two shoes would react through said arm and equalize. The lateral shifting of the actuating shaft 25 entails a corresponding shifting of the bearing 28 and this is permitted as is best shown in dash lines in Figure 4 by the mounting of the arm 29 under pressure of the spring 32, said spring yielding when necessary to permit a slight angular movement of said arm.

The shoes 11 and 12 in rocking about their pivots 15 responsive to actuation of the shaft 25 effect a predetermined upward shifting of the brake shoe 13 so as to engage the latter with the drum 8 under a pressure equal to that acting through said shoes 11 and 12. This actuation of the upper shoe 13 jointly by the shoes 11 and 12 insures an accurately timed braking movement of the three shoes so that they may engage the drum 8 in perfect unison.

What I claim as my invention is:

1. In a vehicle brake, the combination with a vehicle wheel swivelled for steering movement, and a brake drum carried thereby, of coacting braking means within said drum having ends spaced radially of the drum, an actuating shaft projecting between said ends, and an arm intermediately pivoted upon said shaft transversely of the latter and extending substantially along the extended swivel axis of the wheel establishing an actuating connection to said ends from said shaft, the pivoting of said arm upon the shaft accommodating the swivel movement of the wheel when such movement is concurrent with the actuation of the brakes.

2. In a vehicle brake, the combination with a vehicle wheel swivelled for steering movement, and a brake drum carried thereby, of coacting braking means within said drum providing ends spaced along the extended swivel axis of the wheel, an actuating shaft extending between said ends substantially transversely to said axis, means establishing an actuating connection from said shaft to said ends, and a bearing journaling said shaft adjacent said means, and a mounting for said bearing supported within the drum substantially at the swivel axis of the wheel.

3. In a vehicle brake, the combination with a vehicle wheel, and a king pin mounting said wheel for a swivel steering movement, of a brake drum carried by said wheel, coacting braking means within the drum, an actuating shaft for said means, a bearing journaling said shaft, and means securing said bearing to said king pin.

4. In a vehicle brake, the combination with a vehicle wheel, a king pin mounting said wheel for a swivel steering movement, and a brake drum carried by said wheel, of coacting braking means within said drum, an actuating shaft for said means, a bearing for said shaft, an arm carrying said bearing having a portion seating upon an extremity of the king pin, and means yieldably retaining said portion seated upon the king pin extremity.

5. In a vehicle brake, the combination with a vehicle wheel swivelled for steering movement, of a brake drum carried by said wheel, a pair of brake shoes pivoted within and coacting within said drum and having adjacent ends, an actuating shaft for said shoes extending between said ends, and an arm mounted at an intermediate point thereof upon said shaft, said arm engaging the adjacent ends of said shoes at unequal distances from the pivots of the latter, and the effective lengths of the portions of said arm acting upon the two shoes being differentiated to compensate for said inequality of the distances from the shoe pivots to said points of engagement by the arm.

6. In a vehicle brake, the combination with a vehicle wheel swivelled for steering movement and a brake drum carried thereby, of coacting braking means within said drum having ends, an actuating shaft projecting between said ends, and an arm intermediately pivoted upon said shaft transversely of the latter and extending substantially along the extended swivel axis of the wheel establishing an actuating connection to said ends from said shaft, the pivoting of said arm upon the shaft accommodating the swiveled movement of the wheel when such movement is concurrent with an actuation of the brakes.

7. In a vehicle brake, the combination with a vehicle wheel and a king pin mounting said wheel for a swivel steering movement, of a brake drum carried by said wheel, coacting braking means within the drum, an actuating shaft for said means, a bearing journalling said shaft, and means securing said bearing substantially in the line of the axis of the king pin, said securing means being of a yielding character to permit the actuating shaft end to deflect and equalize the pressures applied in opposite directions forming said shaft.

8. In a vehicle brake, the combination with a vehicle wheel swivelled for steering movement, of a brake drum carried by said wheel, a pair of brake shoes pivoted within and coacting within said drum and having adjacent ends, an actuating shaft for said shoes extending between said ends, and an arm mounted at an intermediate point thereof upon said shaft, said arm engaging the adjacent ends of said shoes at unequal distances from the pivots of the latter, and the effective lengths of the portions of said arm acting upon the two shoes being differentiated to compensate for said inequality of the distances from the shoe pivots to said points of engagement by the arm, a bearing journalling said shaft, securing means for said bearing located substantially in the line of the axis of swivelling of the vehicle wheel, said securing means being of a yielding character to permit the actuating shaft end to deflect and equalize the pressures applied in opposite directions from said shaft.

9. In a vehicle brake, the combination with a vehicle wheel swivelled for steering movement, of a brake drum carried by said wheel, a pair of brake shoes pivoted within and coacting within said drum and having adjacent ends, an actuating shaft for said shoes extending between said ends, and pressure applying means carried by the actuating shaft and engageable with the adjacent ends of said shoes at unequal distances from the pivots of the latter for applying unequal forces to the respective shoe ends, said forces being proportionate to compensate for said inequality of the distance from the shoe pivots to said points of engagement by the last said pressure applying means.

10. A vehicle brake comprising a brake drum, braking means within said drum having ends spaced radially of the drum and formed with openings therethrough in substantially radial registration, an actuating shaft for said braking means having ends engaging in said openings, and a bearing journaling said shaft, and a yieldable mounting for said bearing permitting the actuating shaft to deflect and equalize the pressures applied in opposite directions from said shaft.

11. In a vehicle brake, the combination with a vehicle wheel swivelled for steering movement, of a brake drum carried thereby and swivelling therewith, coacting braking means within said drum having ends spaced radially of the drum and formed with openings therethrough in substantially radial registration, an actuating member for said braking means having ends engaging in said openings, and actuating means for said member intermediately engaging the same.

12. In a vehicle brake, the combination of a vehicle wheel swivelled for steering movement, and a brake drum carried by said wheel, of coacting braking means within said drum having ends spaced radially of the drum along the extended swivel axis of the wheel, an actuating shaft for said means, an actuating connection from said shaft to said ends pivoted upon said shaft to accommodate swivel movement of the wheel, a bearing journalling said shaft, and a mounting for said bearing adapted for limited lateral movement to provide for equalization of pressures applied in opposite directions from said shaft.

13. In a vehicle brake, the combination with a vehicle wheel swiveled for steering movement, of a brake drum carried thereby, brake shoes within said drum having terminals offset therefrom and arranged in spaced relation to each other, said terminals being provided with openings in substantially radial registration, a rock shaft, and an arm upon said shaft disposed between said terminals and having its ends engaged with the openings therein.

In testimony whereof I affix my signature.

CHARLES A. SAWTELLE.